(12) United States Patent
Patel et al.

(10) Patent No.: US 9,727,242 B2
(45) Date of Patent: *Aug. 8, 2017

(54) SELECTIVE MEMORY DUMP USING USERTOKENS

(71) Applicant: International Business Machines Corporation, Armonk, NY (US)

(72) Inventors: Purvi S. Patel, Rock Hill, SC (US); Ralph A. Sharpe, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/735,194

(22) Filed: Jun. 10, 2015

(65) Prior Publication Data

US 2016/0364169 A1    Dec. 15, 2016

(51) Int. Cl.
| | |
|---|---|
| *G06F 12/00* | (2006.01) |
| *G06F 3/06* | (2006.01) |
| *G06F 11/07* | (2006.01) |
| *G06F 11/14* | (2006.01) |
| *G06F 9/00* | (2006.01) |
| *G06F 13/00* | (2006.01) |
| *G06F 12/06* | (2006.01) |
| *G06F 11/00* | (2006.01) |

(Continued)

(52) U.S. Cl.
CPC .......... *G06F 3/0604* (2013.01); *G06F 3/0608* (2013.01); *G06F 3/0622* (2013.01); *G06F 3/0637* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 9/00* (2013.01); *G06F 11/00* (2013.01); *G06F 11/073* (2013.01); *G06F 11/0706* (2013.01); *G06F 11/079* (2013.01); *G06F 11/0751* (2013.01); *G06F 11/0778* (2013.01); *G06F 11/14* (2013.01); *G06F 11/22* (2013.01); *G06F 12/06* (2013.01); *G06F 12/1045* (2013.01); *G06F 13/00* (2013.01); *G06F 2212/1056* (2013.01)

(58) Field of Classification Search
None
See application file for complete search history.

(56) References Cited

U.S. PATENT DOCUMENTS

| | | | |
|---|---|---|---|
| 7,290,175 | B1 | 10/2007 | Kessler et al. |
| 7,383,471 | B2 | 6/2008 | Dall |

(Continued)

FOREIGN PATENT DOCUMENTS

EP    1638000 A2    3/2006

OTHER PUBLICATIONS

U.S. Appl. No. 15/015,437, filed Feb. 4, 2016, Entitled "Selective Memory Dump Using Usertokens".

(Continued)

*Primary Examiner* — John A Lane
(74) *Attorney, Agent, or Firm* — Walter L. Rudberg

(57) ABSTRACT

Embodiments of the present invention provide efficient systems and methods for selectively dumping memory by using usertokens to specify a address range from 64-bit storage to be included or excluded from a memory dump. Embodiments of the present invention can be used to reduce the requirement for programs to manage lists of address ranges which represent pertinent data for applications.

20 Claims, 3 Drawing Sheets

(51) Int. Cl.
G06F 12/1045 (2016.01)
G06F 11/22 (2006.01)

(56) References Cited

U.S. PATENT DOCUMENTS

| | | |
|---|---|---|
| 7,941,707 B2 | 5/2011 | Sarig et al. |
| 8,453,015 B2 | 5/2013 | Ponnuswamy |
| 8,639,896 B2 | 1/2014 | Bank et al. |
| 8,645,763 B2 | 2/2014 | Szegedi et al. |
| 2013/0290789 A1 | 10/2013 | Wen |
| 2014/0006732 A1 | 1/2014 | Helak et al. |
| 2014/0181359 A1 | 6/2014 | Zhang et al. |
| 2015/0186246 A1* | 7/2015 | Fan ............ G06F 11/366 714/38.11 |
| 2016/0012200 A1* | 1/2016 | Malinowski ....... G06F 11/0778 705/2 |
| 2016/0357624 A1* | 12/2016 | Hashimoto ......... G06F 11/0778 |

OTHER PUBLICATIONS

List of IBM Patents or Patent Applications Treated As Related, Dated Feb. 4, 2016, 2 pages.
Patel et al., "Selective Memory Dump Using Usertokens", U.S. Appl. No. 15/254,434, filed Sep. 1, 2016, pp. 1-14.
Patel et al., "Selective Memory Dump Using Usertokens", U.S. Appl. No. 15/254,500, filed Sep. 1, 2016, pp. 1-14.
IBM Appendix P.: "List of IBM Patents or Patent Application's to be Treated as Related", Dated Oct. 11, 2016, 2 pages.
Ohmann et al.; "Lightweight Control-Flow Instrumentation and Postmortem Analysis in Support of Debugging"; 2013 28th IEEE/ACM International Conference on Automated Software Engineering (ASE); Nov. 11-15, 2013; pp. 378-388; Palo Alto, USA.

* cited by examiner

SELECTIVE MEMORY DUMP USING USERTOKENS

BACKGROUND OF THE INVENTION

The present invention relates generally to the field of memory dumping, and more particularly to dumping 64-bit storage using usertoken(s) to specify the inclusion and exclusion of certain storage into the memory dump.

When feedback is sent automatically by an operating system (OS), the information sent may be in the form of a 'dump' of information collected from the computer. It is often useful to include at least a portion of the contents of the memory in the dump. A full memory dump in modern computer systems may be very large, and often not all of the information contained within the memory dump is useful, or needed, when analyzing the dumped memory data for problem determination.

SUMMARY

According to one embodiment of the present invention, a method for selectively dumping memory is provided, the method comprising: validating, by one or more processors, access to a list of usertokens; determining, by one or more processors, a number of usertoken entries from the list of usertokens; and specifying, by one or more processors, a range of data for each usertoken entry from the list of usertokens, wherein the range of data is associated with a section of storage.

According to another embodiment of the present invention, a computer program product for selectively dumping memory is provided, the computer program product comprising: a computer readable storage medium and program instructions stored on the computer readable storage medium, the program instructions comprising: program instructions to validate access to a list of usertokens; program instructions to determine a number of usertoken entries from the list of usertokens; and program instructions to specify a range of data for each usertoken entry from the list of usertokens, wherein the range of data is associated with a section of storage.

According to another embodiment of the present invention, a system for selectively dumping memory is provided, the system comprising: one or more computer processors; one or more computer readable storage media; a dumping module; at least one application configured to send at least one usertoken to the dumping module; and a storage manager configured to manage 64-bit storage areas using the at least one usertoken.

DETAILED DESCRIPTION

With the introduction of 64-bit architecture in z/OS® (available from International Business Machines of Armonk, N.Y.), the volume of storage has increased beyond the limits of the 2 gigabyte (GB) address space limitation. Individual applications can create and access GBs of storage alone, so aggregating multiple applications can result in the utilization of vast volumes of storage. The z/OS® dumping component was enhanced to automatically include all 64-bit storage in the dump, when the corresponding below storage area (i.e., below the 2 GB area) was requested as a dump option, regardless of the address space ownership. However, with a greater volume of data, more space is needed to save the data, and more resources are needed to capture the data, move the data, and analyze the data. Embodiments of the present invention provide methods and systems for reducing the amount of 64-bit data captured during a storage memory dump through the use of usertokens, which represent ranges of storage addresses.

Figure 1:
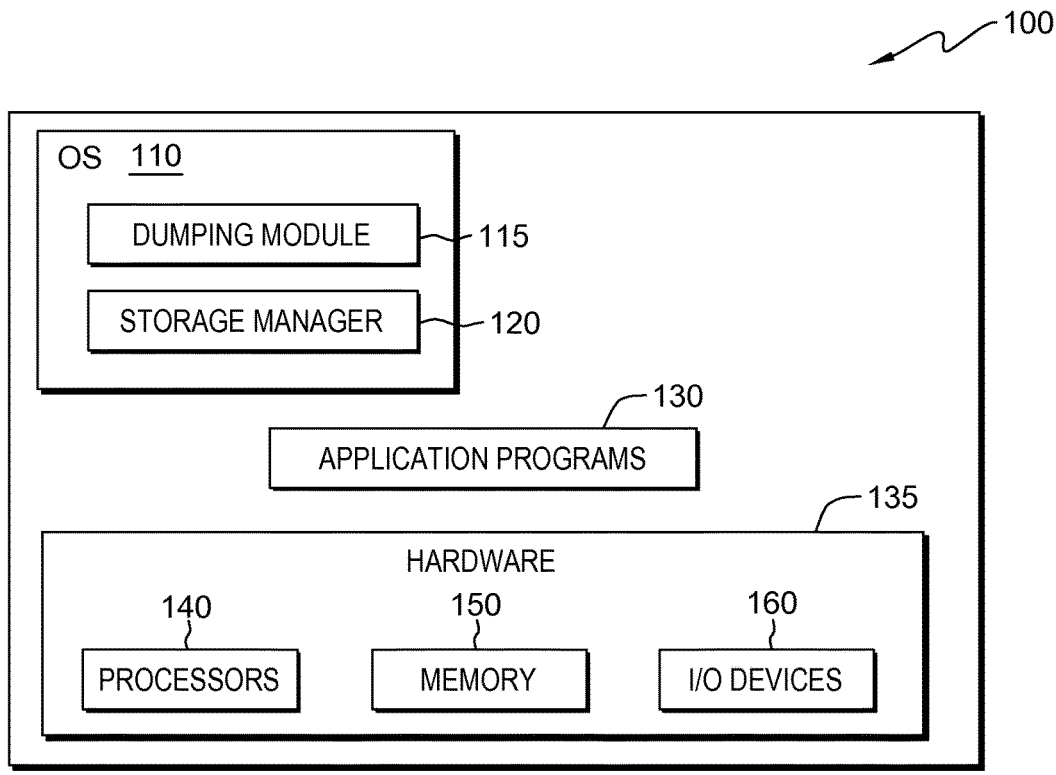
FIG. 1 depicts a functional block diagram of a computing environment, in accordance with an embodiment of the present invention.

The present invention will now be described in detail with reference to the Figures. FIG. 1 depicts a functional block diagram illustrating a computing environment, generally designated 100, in accordance with an embodiment of the present invention. Modifications to computing environment 100 may be made by those skilled in the art without departing from the scope of the invention as recited by the claims. In an exemplary embodiment, computing environment 100 includes operating system (OS) 110, application programs 130, and hardware 135. Computing environment 100 may include additional devices, servers, or other components not shown in FIG. 1.

Hardware 135 includes one or more processors 140, memory 150, and one or more I/O devices 160. In this exemplary embodiment, OS 110 includes dumping module 115 and storage manager 120. Dumping module 115 is a dumping engine for generating memory dumps. In this exemplary embodiment, dumping module 115 accepts a list of usertokens, obtains the matching storage address ranges from storage manager 120, and captures the associated data for each address range to write to the dump dataset. In this exemplary embodiment, dumping module 115 can be enhanced to accept a list of usertoken(s) from an exploiter to dump the associated 64-bit storage areas in the dump. Any type of 64-bit storage (i.e., common, private, or shared) can be dumped using the specified usertoken. Hereinafter, all references to 64-bit storage (common, private, and shared) refer to 64-bit storage which have addresses greater than 2 GB (i.e., high storage).

Storage manager 120 contains 64-bit storage services, which support the specification of a usertoken when creating common and/or private memory objects.

Application programs 130 use storage manager 120 services to obtain memory objects. Application programs 130 identify the 64-bit storage areas that are essential for diagnostics in the event of an error and can use a usertoken that is unique to a component or a product when these identified storage areas are requested via 64-bit storage services. In this exemplary embodiment, a usertoken is unique for application programs 130, and application programs 130 can use one usertoken for all of the identified 64-bit storage areas, or may use multiple unique usertokens for the identified 64-bit storage areas. Application programs 130 can then pass a list of the usertokens to dumping module 115.

Figure 2:
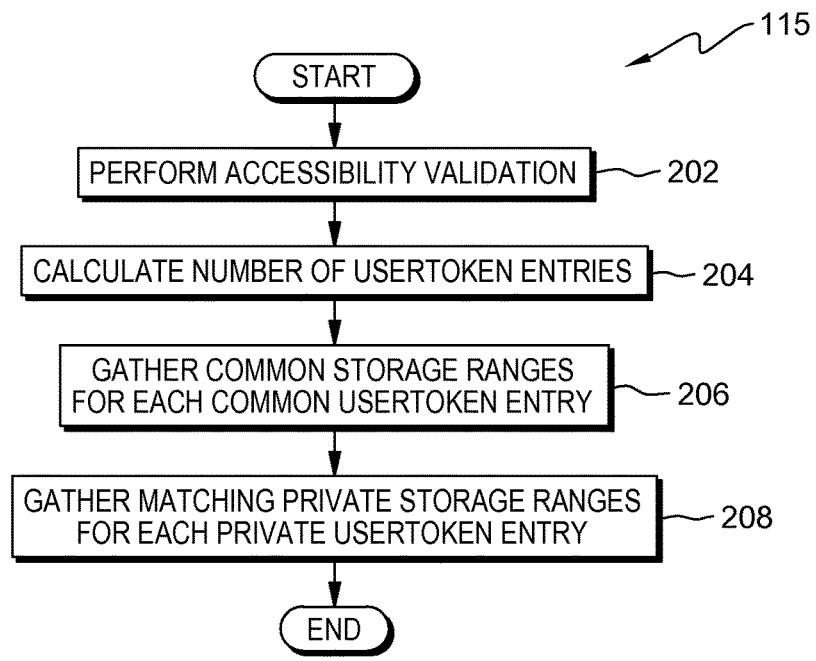
FIG. 2 depicts a flowchart illustrating operational steps of a dumping module for accepting a list of usertokens, in accordance with an embodiment of the present invention.

FIG. 2 depicts a flowchart illustrating operational steps of dumping module 115 for accepting a list of usertokens, in accordance with an embodiment of the present invention.

In step 202, dumping module 115 performs a preliminary accessibility validation. In this exemplary embodiment, dumping module 115 performs an accessibility validation to the exploiter's usertoken area, confirming that the supplied list of usertokens is useable.

In step 204, dumping module 115 calculates the number of usertoken entries. In this exemplary embodiment, dumping module 115 is provided with the total length of the usertoken list, as well as one or more usertoken entries. Dumping module 115 determines the number of usertoken entries by dividing the entire list by the known usertoken entry length. In this exemplary embodiment, one usertoken can be associated with multiple memory objects in different types of 64-bit storage (i.e., private or common), and at different addresses. The usertoken list is described further in FIG. 3.

In step 206, dumping module 115 gathers the common storage ranges for each common usertoken entry. In this exemplary embodiment, when there are usertoken entries to process, dumping module 115 traverses through the usertoken entries to capture the matching common storage during a global data capture. The specified usertoken is passed to storage manager 120, requesting the matching 64-bit common storage ranges of the memory to be included in the dump. The ranges are added to a table in another portion of common memory, to be used to capture the associated data later in the dump processing.

In step 208, dumping module 115 gathers the matching private storage ranges for each private usertoken entry. In this exemplary embodiment, the local data capture follows a similar process as that of the global data capture (step 206), to capture the private storage, when the address space specified in the usertoken entry matches the address space being dumped. The ranges are added to a table, in another portion of storage, to be used to capture the associated data later in the dump processing.

If the address space identifier is not specified for a private storage usertoken entry, then, dumping module 115 captures the matching 64-bit private storage for each address space taking a part in the memory dump. This feature also becomes useful when an exploiter, for example, application programs 130, choose the same usertoken for obtaining 64-bit private storage in multiple address spaces. In this way, the relevant data is captured faster, with the least amount of burden on application programs 130, and the debugger has less data to look through to find useful information. This aligns with the philosophy of First Failure Data Capture (FFDC), or getting all of the required data for the first occurrence of a problem.

After all of the common storage and private storage ranges have been added to the appropriate tables, dumping module 115 captures the associated data for each specified range, and writes the data to the dump dataset.

In some embodiments, the usertokens can be used to minimize the capturing of sensitive data in a memory dump, for example, by associating the sensitive data with an excluded usertoken when requesting a dump.

Accordingly, by performing operational steps of FIG. 2, the 64-bit storage inclusion or exclusion from a dump is customizable by enhancing dumping module 115 to accept a list of usertoken(s) via a new parameter. The need for programs to manage lists of address ranges that represent pertinent data for any application that exploits the memory usertokens is greatly reduced.

Figure 3:
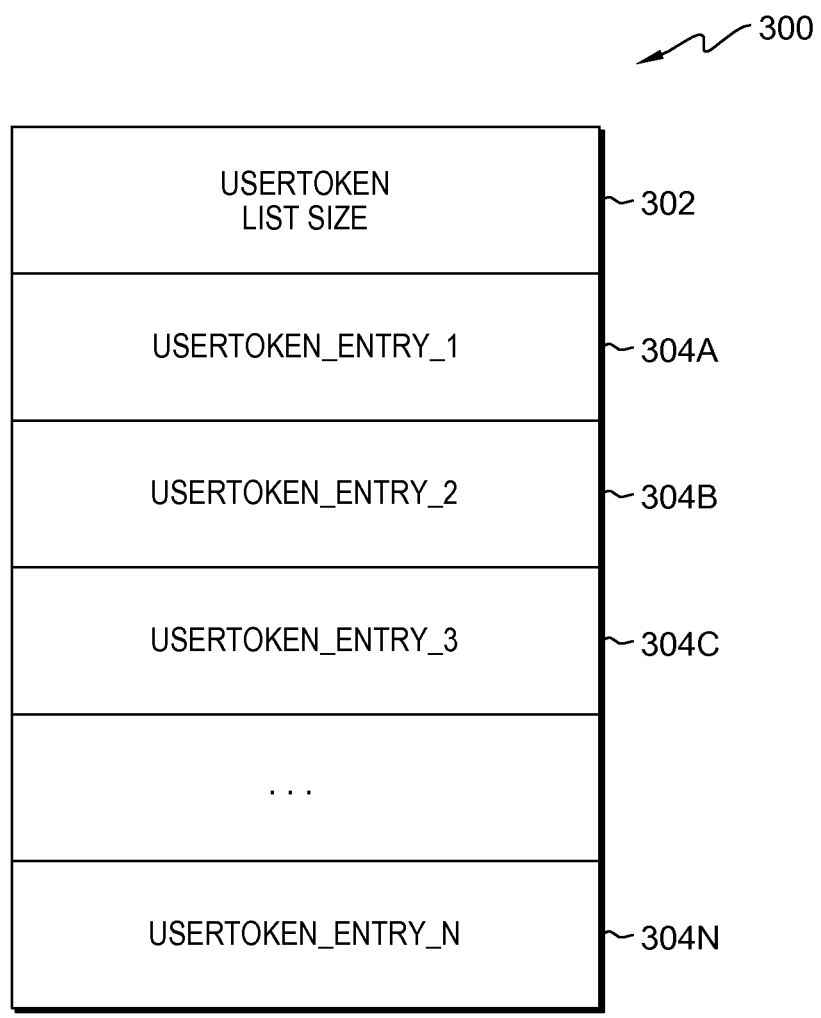
FIG. 3 depicts an example of a usertoken list layout, in accordance with an embodiment of the present invention.

FIG. 3 depicts an example of a usertoken list layout, in accordance with an embodiment of the present invention.

In this exemplary embodiment, dumping module 115 is provided with a list of usertokens and determines the total number of usertoken entries (step 204 of FIG. 2). Each specified usertoken within usertoken list 300 must contain enough information such that dumping module 115 is able to recognize when to capture the storage associated with the specified usertoken(s) during processing. For example, as depicted in FIG. 3, usertoken list 300 includes usertoken list size 302, and a number of usertoken entries 304A-N. Each of usertoken entries 304A-N contains the storage type (e.g., common storage or private storage), usertoken, and the address space identifier.

Figure 4:
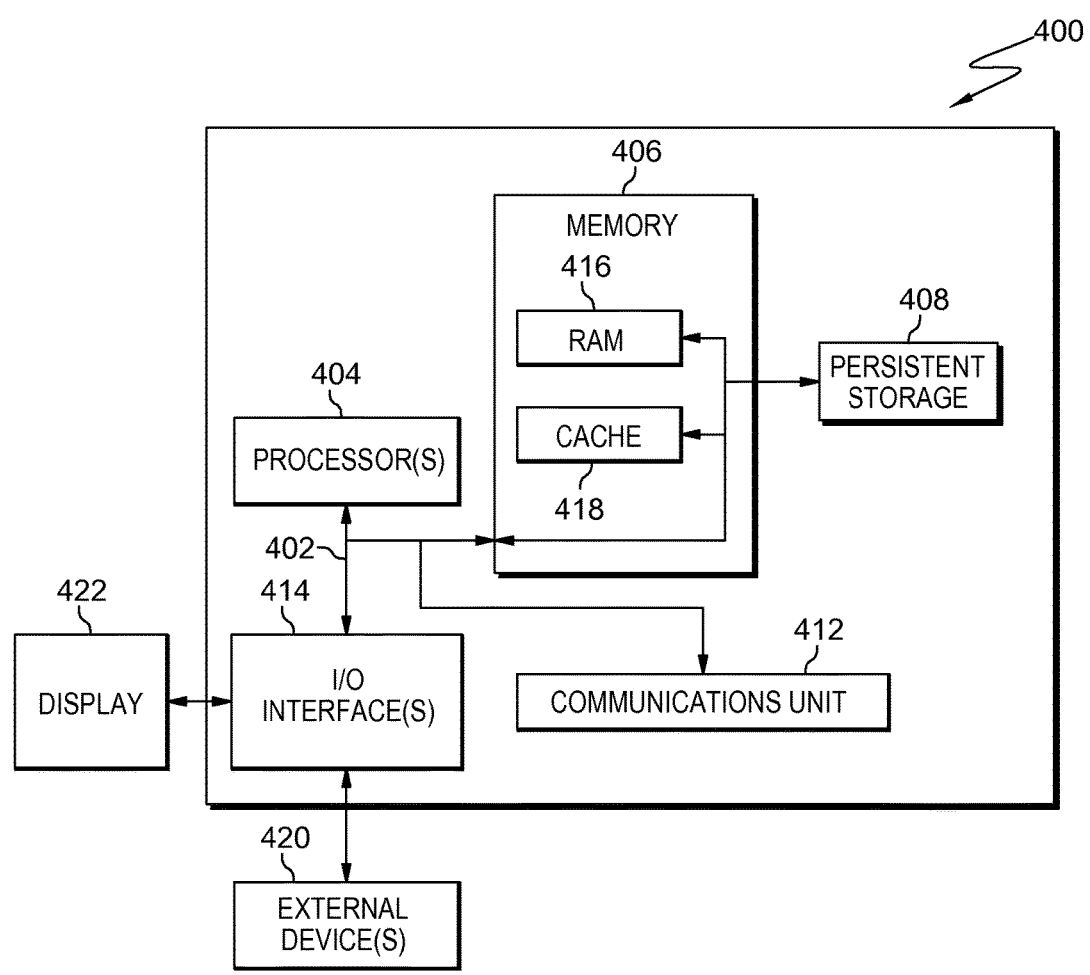
FIG. 4 depicts a block diagram of internal and external components of a computing environment, in accordance with an illustrative embodiment of the present invention.

FIG. 4 depicts a block diagram of computing environment 400, which is representative of various components of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing environment 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Program files are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Applications and/or programs may be downloaded to persistent storage 408 through communications unit 412.

I/O interface(s) 414 allows for input and output of data with other devices that may be connected to computing environment 400. For example, I/O interface 414 may provide a connection to external device(s) 420 such as a keyboard, keypad, a touch screen, and/or some other suitable input device. External device(s) 420 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor or an incorporated display screen, such as is used in tablet computers and smart phones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selectively dumping memory, the method comprising:
   validating, by one or more processors, access to a list of usertokens;
   determining, by one or more processors, a number of usertoken entries from the list of usertokens, wherein
      each usertoken entry is associated with more than one memory objects in 64-bit private or common storage, and
      each usertoken entry from the list of usertokens comprises: a storage type, an address space identifier, and a usertoken; and
   specifying, by one or more processors, a range of data for each usertoken entry from the list of usertokens, wherein the range of data is associated with a section of storage.

2. The method of claim 1, further comprising:
   capturing, by one or more processors, the section of storage associated with the range of data during a data capture.

3. The method of claim 2, further comprising:
   responsive to capturing the section of storage associated with the range of data during the data capture, writing, by one or more processors, information associated with the section of storage to a dump dataset.

4. The method of claim 1, wherein the specified range of data for each usertoken entry from the list of usertokens is passed to a storage manager.

5. The method of claim 1, wherein the usertoken entry is associated with more than one memory object.

6. The method of claim 1, wherein each usertoken entry from the list of usertokens comprises: a storage type, an address space identifier, and a usertoken.

7. The method of claim 6, wherein the storage type comprises at least one of: private storage, common storage, and shared storage.

8. A computer program product for selectively dumping memory, the computer program product comprising:
   a computer readable storage medium and program instructions stored on the computer readable storage medium, the program instructions comprising:
   program instructions to validate access to a list of usertokens;
   program instructions to determine a number of usertoken entries from the list of usertokens, wherein
      each usertoken entry is associated with more than one memory objects in 64-bit private or common storage, and
      each usertoken entry from the list of usertokens comprises: a storage type, an address space identifier, and a usertoken; and
   program instructions to specify a range of data for each usertoken entry from the list of usertokens, wherein the range of data is associated with a section of storage.

9. The computer program product of claim 8, further comprising:
   program instructions to capture the section of storage associated with the range of data during a data capture.

10. The computer program product of claim 9, further comprising:
    program instructions to, responsive to capturing the section of storage associated with the range of data during the data capture, write information associated with the section of storage to a dump dataset.

11. The computer program product of claim 8, wherein the specified range of data for each usertoken entry from the list of usertokens is passed to a storage manager.

12. The computer program product of claim 8, wherein the usertoken entry is associated with more than one memory object.

13. The computer program product of claim 8, wherein each usertoken entry from the list of usertokens comprises: a storage type, an address space identifier, and a usertoken.

14. A system for selectively dumping memory, the system comprising:
    one or more computer processors;
    one or more computer readable storage media;
    a dumping module, wherein the dumping module is configured to:
       determine a number of usertoken entries from a list of usertokens wherein:
          each usertoken entry is associated with more than one memory objects in 64-bit private or common storage, and
          each usertoken entry from the list of usertokens comprises: a storage type, an address space identifier, and a usertoken;
    at least one application configured to send at least one usertoken to the dumping module,
    a storage manager configured to manage 64-bit storage areas using the at least one usertoken.

15. The system of claim 14, wherein the at least one application is configured to exploit usertokens for 64-bit storage.

16. The system of claim 14, wherein the dumping module is further configured to:
    specify a range of data for each usertoken entry from the list of usertokens, wherein the range of data is associated with a section of storage.

17. The system of claim 16, wherein the storage manager is configured to receive the specified range of data for each usertoken entry from the list of usertokens.

18. The system of claim 16, wherein each usertoken entry from the list of usertokens comprises: a storage type, an address space identifier, and a usertoken.

19. The system of claim 14, wherein the dumping module is configured to capture a section of storage associated with a range of data, during a data capture.

20. The system of claim 14, wherein the at least one usertoken is associated with more than one memory object.

* * * * *